UNITED STATES PATENT OFFICE.

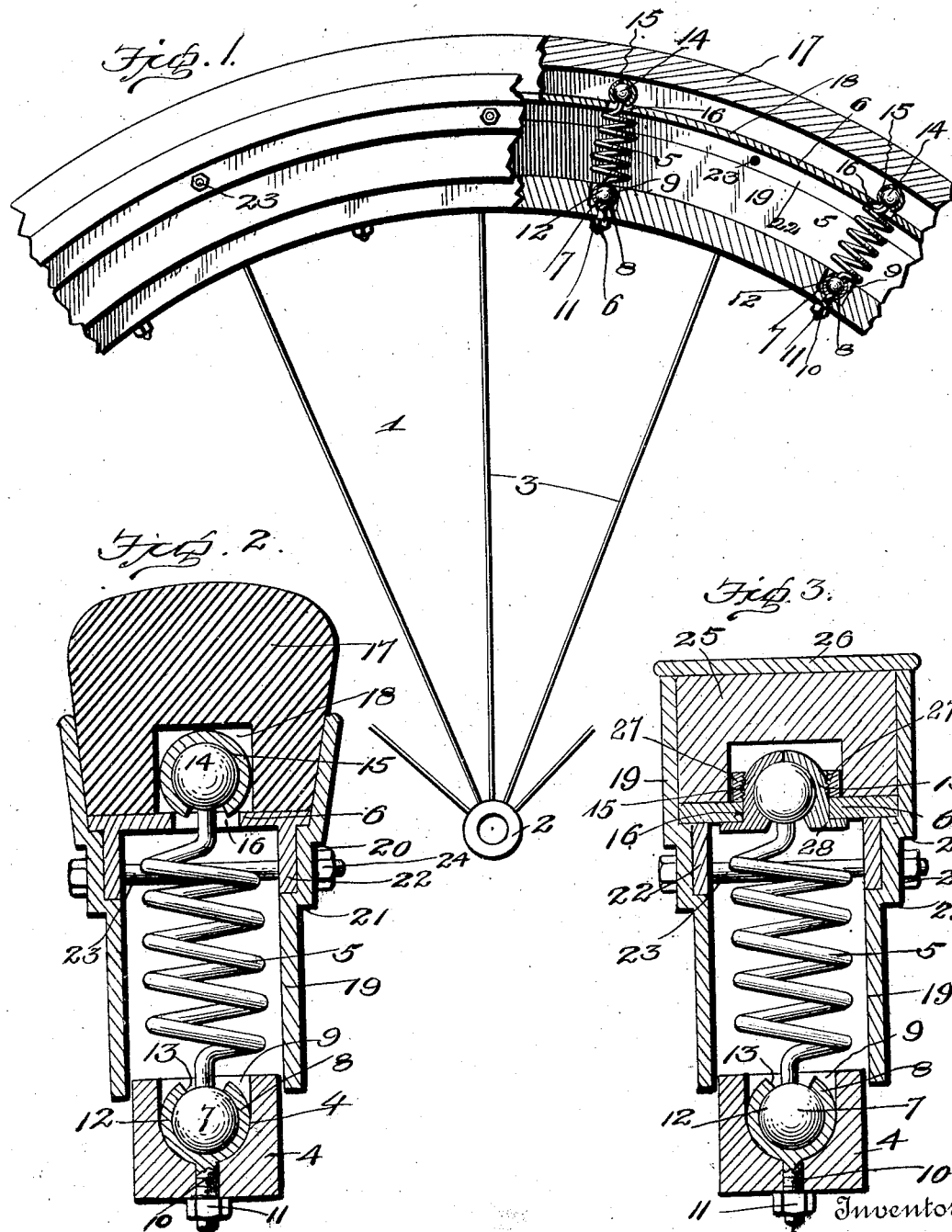

CARLTON B. CHASE, OF WORCESTER, NEW YORK.

WHEEL.

No. 917,001.  Specification of Letters Patent.  Patented April 6, 1909.

Application filed March 19, 1908. Serial No. 422,118.

*To all whom it may concern:*

Be it known that I, CARLTON B. CHASE, a citizen of the United States, residing at Worcester, in the county of Otsego and State of New York, have invented certain new and useful Improvements in Wheels; and I do declare the following to be a full, clear, and exact description of the invention, such as will enable others skilled in the art to which it appertains to make and use the same.

This invention relates to improvements in cushion tired wheels.

The object of this invention is to provide a resilient or yieldingly mounted outer rim for vehicle wheels to take the place of pneumatic tires.

A further object is to provide a wheel of this character which will be simple in construction, strong, durable, efficient and well adapted to the purpose for which it is designed.

With these and other objects in view, the invention consists of certain novel features of construction, combination and arrangement of parts as will be more fully described and particularly pointed out in the appended claims.

In the accompanying drawings, Figure 1 is a side elevation of a wheel, partly in longitudinal section constructed in accordance with the invention; Fig. 2 is a detail cross sectional view through one side of the wheel, and Fig. 3 is a detail cross sectional view of a modification.

Referring more particularly to the drawings, 1 denotes the wheel having a hub 2 and spokes 3 of any suitable construction, the latter being here shown as wire spokes on the outer end of which is secured an inner rim 4 which may be formed of wood or metal.

To the rim 4 is secured the inner ends of an annular series of radially disposed coils 5. Around the inner rim 4 beyond the springs 5 is arranged an outer rim 6. The spring 5 is secured to the inner rim 4 by means of a ball and socket bearing 7, the socket 8 of which is embedded in a suitable cavity 9 in the inner rim 4, and is provided with an inwardly projecting bolt 10 by means of which together with the nut 11, the socket 8 is firmly bolted to the rim 4 and in the socket 9.

The spring 5 is provided at its inner end with a ball 12 which has limited universal movement in said socket the connection with said spring being made through the opening 13. The outer end of the spring 5 is also provided with a ball 14 having limited universal movement in the socket 15, the socket 15 resting on the edges of a hole 16 in the outer rim 6.

Closely fitting around the outer rim 6 is a tire 17 of resilient material such as rubber or wood, said tire being provided with an inner groove 18 which provides a space for the reception of the socket 15. On each side of the complete wheel rim as thus described are the annular side plates 19 provided with outer shoulders 20 and inner shoulders 21. The outer rim 6 is provided with inwardly projecting flanges 22 slightly removed from the edges of the outer rim 6 whereby is formed a shoulder to coöperate with the outer shoulder 20 of the side plate.

The inner edge of the flange 22 provides a shoulder to coöperate with the inner shoulder 21 of the side plate. Passing through the portion of said side plates between the shoulders 20 and 21 and through said inwardly projecting flanges 22 are the transverse binding bolts 23 provided with the nut 24 whereby the side plates 19 are held in firm engagement with the outer rim 6.

The outer rim 6 and the side plates are so designed and combined that the inner rim 4 has easy vertical movement between said side plates. The strength and size of the springs 5 is so selected that the inner rim 4 will have a vertical play sufficient to at all times maintain a portion of the rim 4 between said side plates, but at the same time give sufficient movement to provide a very resilient and easy running wheel.

In the modification shown in Fig. 3, instead of the tire 17 being of highly resilient material, I provide an inner tire 25 of wood or the like provided with the groove 18 for the reception of the socket 15. In this case, the side plates 19 are made to extend out flat without a flare as shown and the inner tire 25 is provided with an outer tire 26 of iron, said tire being designed to protect the inner tire 25 and the outer edges of the plates 19. This modification is intended to be used under conditions where it is not desirable to use a rubber outer tire, as, for instance, with wagons, drays or the like.

Fig. 3 shows another modification, which may, if desired, be added to the construction shown in Figs. 1 and 2. This modification consists in dividing the socket 15 into two parts and holding the same together by the threaded engagement of a nut resting against the rim 6. A flange is provided which together with the nut 27 holds the two sections of the socket 15 in place.

In assembling either of the forms of tires shown, all of the various parts are assembled first, and then the side plates 19 are put in place and secured by means of the bolts 23.

In the wheel construction as herein described, the load supported by the wheel will be suspended by the springs above the hub of the wheel and resisted by those below. The suspending and resisting power of the springs being about equal will maintain the hub of the wheel in a central position. When, however, the load is such as to force the lower side of the inner rim or wheel downwardly, said rim will slide between the side plates 19 which will guide said inner rim and prevent any lateral turning of the same.

From the foregoing description taken in connection with the accompanying drawings, the construction and operation of the invention will be readily understood without requiring a more extended explanation.
Various changes in the form, proportion and the minor details of construction may be resorted to without departing from the principle or sacrificing any of the advantages of the invention, as defined in the appended claims.

Having thus fully described my invention, what I claim as new and desire to secure by United States Letters-Patent is:

1. In a wheel, an outer rim and an inner rim, a plurality of springs having their ends secured to said rims, said inner rim being provided with a series of recesses, sockets in said recesses, said sockets being provided with inwardly projecting bolts by means of which said sockets are secured in said recesses, and balls secured to the inner end of said springs and having limited universal movement in said sockets.

2. In a wheel, an outer rim, an inner rim, a plurality of springs connecting said rims, said inner rim being provided with a plurality of recesses, sockets in said recesses and provided with bolts by means of which said sockets are secured to said rim, balls on the inner ends of said springs and having limited universal movement in said sockets, said outer rim being provided with a plurality of openings, ball and socket bearings on the outer ends of said springs, the sockets of said bearings resting upon the outer edges of said openings, said outer rim being also provided with inwardly projecting flanges removed from the edges of said outer rim, side plates having spaced shoulders adapted to coöperate with the free edges of said outer rim and said flanges, said side plates extending outwardly beyond said outer rim and extending inwardly to slidably receive therebetween said inner rim, a tire between the outer edges of said plates and fitting against the outer face of said outer rim, said tire being provided with an annular groove whereby is formed a space for said ball and socket bearings, and bolts passing through said flanges and said side plates to hold said side plates in position.

3. In a wheel, an outer rim and an inner rim, inwardly-projecting radial flanges formed on said outer rim, said flanges being arranged near the opposite edges of the rim whereby said edges form laterally projecting annular flanges, side plates arranged on each side of said rims, said plates having formed therein annular offsets adapted to form seats to receive the radial and lateral flanges on said outer rim, transverse bolts arranged through said plates and radial flanges on said rim, and a series of springs to connect said rims together.

4. A vehicle wheel comprising a hub having radially-disposed spokes, an inner rim secured to said spokes, an annular series of radially disposed springs removably secured at their inner ends to the inner rim of said wheel, an outer rim arranged around the outer ends of said springs, said rim having radially and laterally projecting annular flanges, spring inclosing plates rigidly secured to said outer rim and loosely embracing said inner rim, said plates having annular offsets to receive the flanges on said outer rim, sockets engaged with said inner and outer rims, balls secured to the opposite ends of said springs and engaged with said sockets, and a tire arranged on the outer side of said outer rim, said tire having an annular channel on its inner side to receive the sockets and balls of said outer rim.

In testimony whereof I have hereunto set my hand in presence of two subscribing witnesses.

CARLTON B. CHASE.

Witnesses:
A. W. CHASE,
DAVID W. SHELLAND.